United States Patent
Vetlugin et al.

(10) Patent No.: US 12,523,525 B2
(45) Date of Patent: Jan. 13, 2026

(54) METHOD OF DETECTING PHOTONS AND PHOTON DETECTOR ARRANGEMENT

(71) Applicants: NANYANG TECHNOLOGICAL UNIVERSITY, Singapore (SG); UNIVERSITY OF SOUTHAMPTON, Southampton (GB)

(72) Inventors: Anton Vetlugin, Singapore (SG); Cesare Soci, Singapore (SG); Nikolay Ivanovich Zheludev, Singapore (SG)

(73) Assignees: Nanyang Technological University, Singapore (SG); University of Southampton, Southampton (GB)

( * ) Notice: Subject to any disclaimer, the term of this patent is extended or adjusted under 35 U.S.C. 154(b) by 0 days.

(21) Appl. No.: 18/286,909

(22) PCT Filed: May 13, 2022

(86) PCT No.: PCT/SG2022/050318
§ 371 (c)(1),
(2) Date: Oct. 13, 2023

(87) PCT Pub. No.: WO2022/245285
PCT Pub. Date: Nov. 24, 2022

(65) Prior Publication Data
US 2024/0192052 A1      Jun. 13, 2024

(30) Foreign Application Priority Data
May 17, 2021   (SG) .............. 10202105111Q

(51) Int. Cl.
*G01J 1/44*   (2006.01)
*G01J 1/04*   (2006.01)
*G01J 1/42*   (2006.01)

(52) U.S. Cl.
CPC ............ *G01J 1/44* (2013.01); *G01J 1/0425* (2013.01); *G01J 1/4228* (2013.01); *G01J 2001/442* (2013.01)

(58) Field of Classification Search
CPC .......... G01J 1/44; G01J 1/0425; G01J 1/4228; G01J 2001/442
See application file for complete search history.

(56) References Cited

U.S. PATENT DOCUMENTS

2005/0248488 A1*  11/2005  Modro ............... H01Q 13/16
                                                          343/700 MS
2006/0132788 A1*  6/2006   Marino .............. G01C 19/64
                                                          356/461

(Continued)

FOREIGN PATENT DOCUMENTS

CN      102829884 A    12/2012
CN      107507884 B    12/2020

(Continued)

OTHER PUBLICATIONS

Roger, T. et al. Coherent perfect absorption in deeply subwavelength films in the single-photon regime. Nat. Commun. 6:7031 doi:10.1038/ncomms8031 (2015). (Year: 2015).*

(Continued)

*Primary Examiner* — Georgia Y Epps
*Assistant Examiner* — Monica T Taba
(74) *Attorney, Agent, or Firm* — Cesari and McKenna, LLP; Steven M. Mills

(57) ABSTRACT

According to embodiments of the present invention, a method of detecting photons is provided. The method includes arranging a plurality of light absorbing elements to interact with an electromagnetic standing wave at a corresponding plurality of points of the electromagnetic standing wave to absorb at least part of the electromagnetic standing wave, the plurality of light absorbing elements being spaced (Continued)

apart from each other, and detecting electrical signals generated in response to the absorption to detect photons corresponding to the electromagnetic standing wave. According to further embodiments of the present invention, a photon detector arrangement is also provided.

9 Claims, 8 Drawing Sheets

(56) References Cited

U.S. PATENT DOCUMENTS

| | | | | |
|---|---|---|---|---|
| 2007/0273055 | A1* | 11/2007 | Sazio | G02B 6/02385 264/1.24 |
| 2009/0052479 | A1* | 2/2009 | Salokatve | H01S 3/1118 372/18 |
| 2015/0049377 | A1* | 2/2015 | Zheludev | G02B 5/008 359/244 |
| 2017/0092834 | A1* | 3/2017 | Fong | H10N 60/12 |
| 2019/0323886 | A1 | 10/2019 | Thompson et al. | |
| 2021/0138257 | A1* | 5/2021 | Dolgoff | A61B 6/032 |
| 2022/0236108 | A1* | 7/2022 | Perrenoud | G01J 5/20 |

FOREIGN PATENT DOCUMENTS

| | | | |
|---|---|---|---|
| WO | 2018011023 | A1 | 1/2018 |
| WO | 2018011035 | A1 | 1/2018 |
| WO | 2021/004733 | A1 | 1/2021 |

OTHER PUBLICATIONS

Coherent perfect absorption in deeply subwavelength films (Year: 2015).*
Tame et al., "Quantum plasmonics," Nature Physics, vol. 9, pp. 329-340, 2013.
Tittel et al., "Experimental demonstration of quantum secret sharing," Physical Review A, vol. 63, No. 042301, pp. 1-6, 2001.
Tsai et al., "Spectral Compression of Narrowband Single Photons with a Resonant Cavity," arXiv:2001.00423 [quant-ph], pp. 1-5, 2020.
Van Der Wal et al., "Atomic Memory for CorrelatedPhoton States," Science, vol. 301, pp. 196-200, 2003.
Vernaz-Gris et al., "Highly-efficient quantum memory for polarization qubits in a spatially-multiplexed cold atomic ensemble," Nature Communications, vol. 9, No. 363, pp. 1-6, 2018.
Vest et al., "Anti-coalescence of bosons on a lossybeam splitter," Science, vol. 356, pp. 1373-1376, 2017.
Vetlugin et al., "Addressable parallel cavity-based quantum memory," The European Physical Journal D, vol. 68, No. 269, pp. 1-9, 2014.
Vetlugin et al., "Coherent perfect absorption of single photons in a fiber network," Applied Physics Letters, vol. 115, No. 191101, pp. 1-4, 2019.
Vetlugin et al., "Multivariate quantum memory as controllable delayed multi-port beamsplitter," EPL, vol. 113, No. 64005, pp. 1-6, 2016.
Wan et al., "Time-Reversed Lasing and Interferometric Control of Absorption," Science, vol. 331, pp. 889-892, 2011.
Wang et al., "Efficient quantum memory for single-photon polarization qubits," Nature Photonics, vol. 13, pp. 346-351, 2019.
Yanigonul et al., "Phase stabilization of a coherent fiber network by single-photon counting," Optics Letters, vol. 45, No. 10, pp. 2740-2743, 2020.
Zarkeshian et al., "Entanglement between more than two hundred macroscopic atomic ensembles in a solid," Nature Communications, vol. 8, No. 906, pp. 1-10, 2017.
Zhang et al., "Controlling light-with-light without nonlinearity," Light: Science & Applications, vol. 1, pp. 1-5, 2012.
Zugenmaier et al., "Long-lived non-classical correlations towards quantum communication at room temperature," Communications Physics, vol. 1, No. 76, pp. 1-7, 2018.

Adcock et al., "Programmable four-photon graph states on a silicon chip," Nature Communications, vol. 10, No. 3528, pp. 1-6, 2019.
Altewischer et al., "Plasmon-assisted transmission of entangled photons," Nature, vol. 418, pp. 304-306, 2002.
Altuzarra et al., "Coherent Perfect Absorption in Metamaterials with Entangled Photons," ACS Photonics, vol. 4, pp. 2124-2128, 2017.
Arute et al., "Quantum supremacy using a programmable superconducting processor," Nature, vol. 574, pp. 505-510, 2019.
Baranov et al., "Coherent perfect absorbers: linearcontrol of light with light," Nature Reviews, vol. 2, Art. 17064, pp. 1-14, 2017.
Barnett et al., "Quantum optics of lossy beam splitters," Physical Review A, vol. 57, No. 3, pp. 2134-2145, 1998.
Bennett et al., "Quantum cryptography:Public key distribution and coin tossing," Theoretical Computer Science, vol. 560, pp. 7-11, 2014.
Chen et al., "Memory-built-in quantum teleportation with photonic and atomic qubits," Nature Physics, vol. 4, pp. 103-107, 2008.
Chiribella et al., "Quantum Circuit Architecture," Physical Review Letters, vol. 101, No. 060401, pp. 1-4, 2008.
Choi et al., "Entanglement of spin waves among four quantum memories," Nature, vol. 468, pp. 412-416, 2010.
Choi et al., "Mapping photonic entanglement into and out of a quantum memory," Nature, vol. 452, pp. 67-71, 2008.
Chong et al., "Coherent Perfect Absorbers: Time-Reversed Lasers," Physical Review Letters, vol. 105, No. 053901, pp. 1-4, 2010.
Corzo et al., "Large Bragg Reflection from One-Dimensional Chains of Trapped Atoms Near a Nanoscale Waveguide," Physical Review Letters, vol. 117, No. 133603, pp. 1-6, 2016.
De Riedmatten et al., "A solid-state light-matter interface at the single-photon level," Nature, vol. 456, pp. 773-777, 2008.
Duan et al., "Long-distance quantum communication with atomic ensembles and linear optics," Nature, vol. 414, pp. 413-418, 2001.
Dur et al., "Three qubits can be entangled in two inequivalent ways," Physical Review A, vol. 62, No. 062314, pp. 1-12, 2000.
Dyakonov et al., "Laser-written polarizing directional coupler with reduced interaction length," Optics Letters, vol. 42, No. 20, pp. 4231-4234, 2017.
Eibl et al., "Experimental Realization of a Three-Qubit Entangled W State," Physical Review Letters, vol. 92, No. 7, pp. 1-4, 2004.
Everett et al., "Time-reversed and coherently enhanced memory: A single-mode quantum atom-optic memory without a cavity," Physical Review A, vol. 98, No. 063846, pp. 1-7, 2018.
Fang et al., "Controlling light with light using coherent metadevices: all-optical transistor, summator and invertor," Light: Science & Applications, vol. 4, pp. 1-7, 2015.
Fleischhauer et al., "Quantum memory for photons: Dark-state polaritons" Physical Review A, vol. 65, No. 022314, pp. 1-12, 2002.
Giovannetti et al., "Quantum-Enhanced Measurements: Beating the Standard Quantum Limit," Science, vol. 306, pp. 1330-1336, 2014.
Gonzalez-Tudela et al., "Deterministic Generation of Arbitrary Photonic States Assisted by Dissipation," Physical Review Letters, vol. 115, No. 163603, pp. 1-6, 2015.
Goodarzi et al., "All-optical fiber optic coherentamplifier," Scientific Reports, vol. 8, No. 15340, pp. 1-6, 2018.
Gu et al., "Quantum computing with continuous-variable clusters," Physical Review A, vol. 79, No. 062318, pp. 1-6, 2009.
Haas et al., "Entangled States of More Than40 Atoms in an Optical Fiber Cavity," Science, vol. 344, pp. 180-183, 2014.
Hardal et al., "Quantum coherent absorption of squeezed light," Optica, vol. 6, No. 2, pp. 181-189, 2019.
Hedges et al., "Efficient quantum memory for light," Nature, vol. 465, pp. 1052-1056, 2010.
Herbauts et al., "Demonstration of active routing of entanglement in a multi-user network," Optics Express, vol. 31, No. 23, pp. 29013-29024, 2013.
Horodecki et al., "Quantum entanglement," Rev. Mod. Phys., pp. 1-110, 2009.
Hosseini et al., "High efficiency coherent optical memory with warm rubidium vapour," Nature Communications, vol. 2, No. 174, pp. 1-5, 2011.
Huang et al., "Coherent perfect absorption of path entangled single photons," Optics Express, vol. 22, No. 17, pp. 20936-20947, 2014.

(56) References Cited

OTHER PUBLICATIONS

Jeffers, "Interference and the lossless lossy beam splitter," Journal of Modern Optics, vol. 47, No. 11, pp. 1819-1824, 2000.

Jeffers, "Nonlocal Coherent Perfect Absorption," Physical Review Letters, vol. 123, No. 143602, pp. 1-5, 2019.

Julsgaard et al., "Experimental demonstration of quantum memory for light," Nature, vol. 432, pp. 482-486, 2004.

Kimble et al., "The quantum internet," Nature, vol. 453, pp. 1023-1030, 2008.

Kuzmich et al., "Generation of nonclassical photon pairs for scalable quantum communication with atomic ensembles," Nature, vol. 423, pp. 731-734, 2003.

Losev et al., "Manipulation of quantum states in a memory cell: controllable Mach-Zehnder interferometer," Laser Physics Letters, vol. 14, pp. 1-10, 2017.

Lucke et al., "Detecting Multiparticle Entanglement of Dicke States," Physical Review Letters, vol. 112, No. 155304, pp. 1-5, 2014.

Luke et al., "Broadband mid-infrared frequency comb generation in a Si3N4 microresonator," Optics Letters, vol. 40, No. 21, pp. 4823-4826, 2015.

Lvovsky et al., "Optical quantum memory," Nature Photonics, vol. 3, pp. 706-714, 2009.

McConnell et al., "Entanglement with negative Wigner function of almost 3,000 atoms heralded by one photon," Nature, vol. 519, pp. 439-442, 2015.

Nielsen, "Optical Quantum Computation Using Cluster States," Physical Review Letters, vol. 93, No. 4, pp. 1-4, 2004.

Roger et al., "Coherent Absorption of N00N States," Physical Review Letters, vol. 117, No. 023601, pp. 1-5, 2016.

Roger et al., "Coherent perfect absorption in deeply subwavelength films in the single-photon regime," Nature Communications, vol. 6, No. 7031, pp. 1-5, 2015.

Sabooni et al., "Efficient Quantum Memory Using a Weakly Absorbing Sample," Physical Review Letters, vol. 110, No. 133604, pp. 1-5, 2013.

Sangouard et al., "Quantum repeaters based on atomic ensembles and linear optics," Review of Modern Physics, vol. 83, No. 1, pp. 33-80, 2011.

Scully et al., "Directed Spontaneous Emission from an Extended Ensemble of N Atoms: Timing Is Everything," Physical Review Letters, vol. 96, No. 010501, pp. 1-4, 2006.

Song et al., "Photon transport mediated by an atomic chain trapped along a photonic crystal waveguide," Physical Review A, vol. 98, No. 023814, pp. 1-9, 2018.

Sorensen et al., "Coherent Backscattering of Light Off One-Dimensional Atomic Strings," Physical Review Letters, vol. 117, No. 133604, pp. 1-5, 2016.

Supplementary European Search Report mailed Feb. 28, 2025 for EP Application No. 22805087 for Nanyang Technological University, 9 pages.

Cavalier Paul et al., "Light interference detection on-chip by integrated SNSPD counters" AIP Advances, vol. 1, No. 4, Oct. 18, 2011, retrieved from the internet: <https://pubs.aip.org/aip/adv/article-pdf/doi/10.1063/1.3656744/12816892/042120_1_online.pdf>.

Feautrier P. et at., "High-speed superconducting single photon detectors for innovative astronomical applications" Journal of Physics: Conference Series, Institute of Physics Publishing, Bristol, GB, vol. 97, No. 1, Feb. 1, 2008, p. 12087.

\* cited by examiner

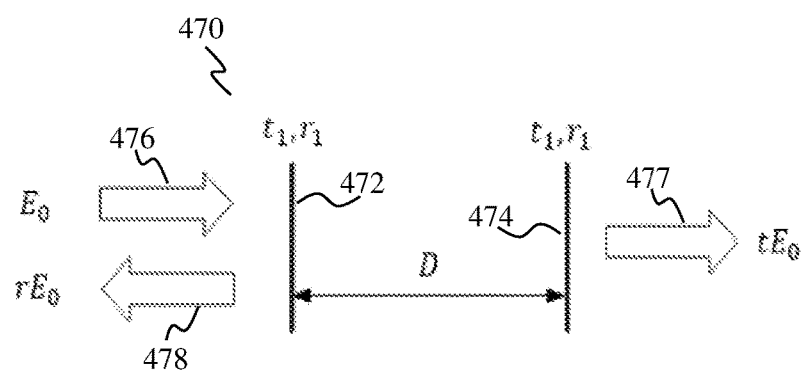
FIG. 4A
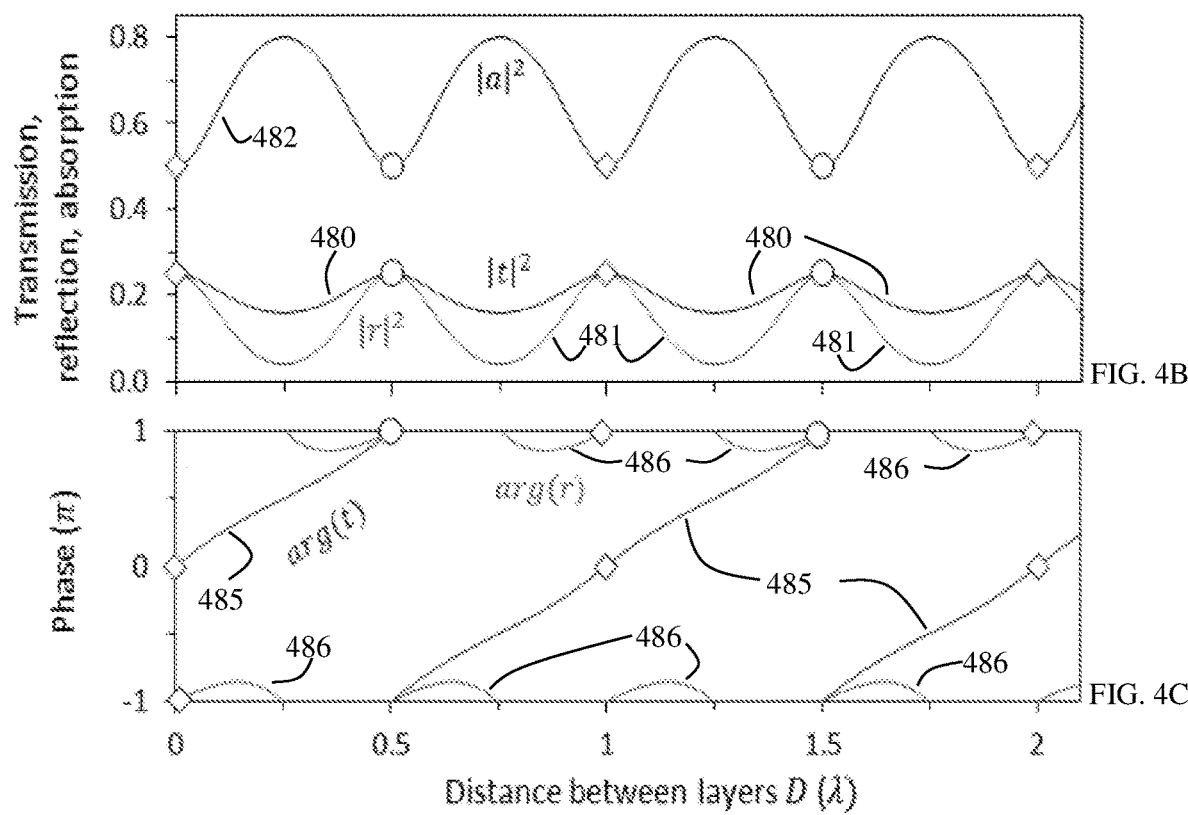
FIG. 4B
FIG. 4C

METHOD OF DETECTING PHOTONS AND PHOTON DETECTOR ARRANGEMENT

CROSS-REFERENCE TO RELATED APPLICATIONS

The present application is a National Stage Application, filed under 35 U.S.C. § 371, of International Application No. PCT/SG2022/050318, filed May 13, 2022, which claims the benefit of priority of Singapore patent application No. 10202105111Q, filed May 17, 2021, the entire contents of which are incorporated herein by reference.

TECHNICAL FIELD

Various embodiments relate to a method of detecting photons and a photon detector arrangement.

BACKGROUND

Quantum optics and quantum information protocols rely on the detection of light of extremely low intensity. The majority of the exploited detectors are single-photon detectors (SPDs) which operate in the 'on-off' regime where the detectors' output signal does not depend on the number of absorbed photons. At the same time, advanced protocols of quantum technology including linear optical quantum computation, quantum communication and key distribution, single-photon source characterization, and quantum states preparation rely on detection schemes able to resolve the number of incoming photons. Moreover, other applications, including fluorescence-lifetime imaging microscopy, x-ray astronomy, laser radar, elementary particle detection and medicine could benefit from the usage of photon number resolving detectors (PNRDs). It was shown that the output signal of some types of photomultiplier tubes (PMT) and single-photon avalanche detectors (SPAD), visible light photon counters (VLPC) and transition edge sensors (TES) actually depend on the number of absorbed photons. This class of detectors is defined as intrinsic photon number resolving detectors (iPNRDs). Despite obvious advantages, iPNRDs suffer from pure photon number resolution even at a few photons level (PMT, SPAD), high dark count rate (VLPC), slow operational rate (VLPC, TES), extreme operation regimes (TES) and relatively high jitter time.

To overcome these limitations, multiplexed photon number resolving detectors (mPNRDs) can be used instead. The operation of mPNRD relies on the multiplication of the incoming quantum light into temporal or spatial modes and the detection of each of these modes independently by non-photon discriminating SPDs. This approach allows exploiting state-of-the-art SPDs, such as superconducting nanowire single-photon detectors (SNSPDs), characterized by low/negligible dark count rate, high operational rate and low jitter time simultaneously, to achieve photon number resolution. It was shown that mPNRDs are equivalent to iPNRDs in photon number resolution if the number of spatial or temporal optical modes is large enough. Moreover, multiplexing with iPNRDs can also be used to exceed the intrinsic photon number resolution of the best available iPNRDs (typically ~10 photons).

In the time multiplication approach, an incoming light pulse is split into a sequence of pulses, or temporal modes, by passing through a series of beamsplitters and delay line loops. Two detectors are placed at the output ports of the last beamsplitter. Each pulse from the sequence (each temporal mode) is detected by these two detectors one at a time. Despite being a relatively cheap solution, time multiplication slows down the operational rate and introduces losses due to the additional optical components and delay line loops. It is noted that (system) detection efficiency is a crucial parameter for practical photon number resolving. For example, to discriminate 2 photons, one may need 7 delay line loops (with the probability of ~99% two photons will occupy two different temporal modes and can be distinguished). Assuming 0.1 dB of insertion and back reflection loss at each loop and ideal detectors, system detection efficiency reduces to 85%, and two photons will be detected with the probability of ~70%. The efficiency of photon number resolution drops exponentially with an increase of the number of photons to be detected and a decrease of system detection efficiency.

In the space multiplication approach, incoming light is spread in multiple transverse spatial modes and sent to a 2D array of SPDs or iPNRDs. Compared to time multiplication, space multiplication allows to fully exploit the fast temporal response of the detectors and does not require additional optical components in the detection scheme. However, unlike time multiplication, space multiplication suffers from non-uniform illumination of different detectors in the 2D array (typically the central pixels are exposed to higher light intensities due to the Gaussian profile of the illuminating beam in the transverse direction), which impairs photon number resolution efficiency. Moreover, the finite spacing of neighboring pixels introduces significant losses.

To summarize, existing multiplexing approaches allow high-quality photon number resolution with either SPDs or iPNRDs. However, to overcome their intrinsic limitations, they rely on repetitive measurements and accumulation of statistics to derive usable photon number information, which is unsuitable for practical implementations.

SUMMARY

The invention is defined in the independent claims. Further embodiments of the invention are defined in the dependent claims.

According to an embodiment, a method of detecting photons is provided. The method may include arranging a plurality of light absorbing elements to interact with an electromagnetic standing wave at a corresponding plurality of points of the electromagnetic standing wave to absorb at least part of the electromagnetic standing wave, the plurality of light absorbing elements being spaced apart from each other, and detecting electrical signals generated in response to the absorption to detect photons corresponding to the electromagnetic standing wave.

According to an embodiment, a photon detector arrangement is provided. The photon detector arrangement may include a plurality of light absorbing elements configured to be arranged spaced apart from each other to interact with an electromagnetic standing wave at a corresponding plurality of points of the electromagnetic standing wave to absorb at least part of the electromagnetic standing wave, and a circuit configured to be electrically coupled to the plurality of light absorbing elements, the circuit being configured to detect electrical signals generated in response to the absorption to detect photons corresponding to the electromagnetic standing wave.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIGS. 4A to 4C show an example of a bi-layered absorber and its optical response.

DETAILED DESCRIPTION

Figure 1A:
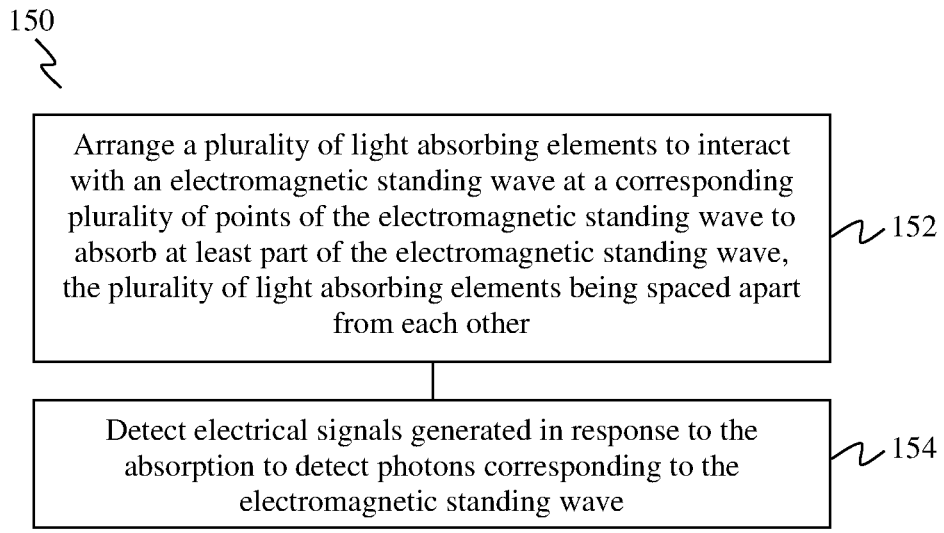
FIG. 1A shows a flow chart illustrating a method of detecting photons, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may provide a method of or for photon number resolving detection without optical mode multiplication.

Various embodiments may relate to one or more quantum radiation detection techniques using distributed coherent perfect absorption phenomenon in a spatially separated array of active layers. The detection may occur in free space or within integrated platforms including optical fibers and (optical) waveguides.

To overcome their intrinsic limitations, known approaches for photon number resolution rely on repetitive measurements and accumulation of statistics to derive usable photon number information. Practical implementations, however, would require high-speed single-shot photon number discrimination, for which requirements are much more stringent:

1) detection efficiency as close as possible to 100%;
2) uniform exposure of all detectors;
3) high detection rate and low time jitter.

None of the existing multiplication approaches fulfills all these three requirements simultaneously.

The techniques disclosed herein may provide a method of photon number resolution where the multiplication of the detectors (e.g., SPDs or iPNRDs) does not or may not require multiplication of the optical modes. In contrast to the known detection of travelling waves, in various embodiments, the method is based on the detection of electromagnetic (EM) standing waves, e.g., free space EM standing waves. Placing one or more or all the detectors at the anti-nodes of a detectable EM standing wave may provide equal exposure of the detectors, while the independent operation of the detectors does not or may not introduce additional time delays. Furthermore, deterministic light absorption (e.g., efficiency=100%) may be achieved by operating in the regime of coherent perfect absorption. Thus, the method of various embodiments may satisfy simultaneously all the above-mentioned requirements for practical application of photon number discriminating detection.

FIG. 1A shows a flow chart 150 illustrating a method of detecting photons, according to various embodiments. At 152, a plurality of light absorbing elements are arranged to interact with an electromagnetic standing wave at a corresponding plurality of points of the electromagnetic standing wave to absorb at least part of the electromagnetic standing wave, the plurality of light absorbing elements being spaced apart from each other.

At 154, electrical signals generated in response to the absorption are detected to detect photons corresponding to the electromagnetic standing wave.

In other words, a method capable of detecting photons associated with an electromagnetic (EM) wave is provided. The method includes interacting an EM standing wave (or EM stationary wave) with multiple light absorbing elements by arranging the light absorbing elements, separated from one another, at or overlapping with corresponding multiple points of (or on) the EM standing wave. With such an arrangement, at least part of the EM standing wave (or the energy or light thereof) is absorbed by the plurality of light absorbing elements.

As a result of the interaction or absorption of the at least part of the EM standing wave by the plurality of light absorbing elements, electrical (output) signals are generated by the plurality of light absorbing elements. The electrical signals are detected (or measured), and/or may be processed, to detect photons corresponding to (or associated with) the EM standing wave. The plurality of light absorbing elements may be electrically coupled to a (electrical) circuit that may detect and/or may process the electrical signals that are generated to detect the photons. The circuit may be part of, for example, a photon counter (or photon counting circuit).

For absorbing the EM standing wave, the plurality of light absorbing elements are arranged to interact with the EM standing wave at points corresponding to non-nodes of the EM standing wave, i.e., points of the EM standing wave other than the nodes of the EM standing wave.

The plurality of light absorbing elements may be arranged periodically, e.g., arranged regularly or uniformly spaced apart from one another.

Each of the plurality of light absorbing elements may be or may include a light absorbing layer or film. Each of the plurality of light absorbing elements may absorb light. Each of the plurality of light absorbing elements may act as an active layer to absorb light. Each of the plurality of light absorbing elements may be or may include or may be part of a detector, or part of a detecting element of a larger detector (or detector arrangement).

In various embodiments, a respective optically transparent spacer may be provided in between respective two (or respective pair of) adjacent light absorbing elements. Non-limiting examples of an optically transparent spacer may include vacuum, air, transparent dielectric, etc.

In various embodiments, the EM standing wave may be or may include an optical standing wave.

It should be appreciated that photons are not only associated with visible light but are also associated with EM waves at different regions of the electromagnetic spectrum, including but not limited to radio waves, microwaves, infrared, ultraviolet light, X-rays, gamma rays, etc. Therefore, it should be appreciated that the term "light" is not limited to visible light.

In various embodiments, the method may further include determining a quantity (or number) of the photons based on the electrical signals. The number of photons may be determined based on the amplitudes and/or number of the electrical signals. The electrical signals may be processed to determine the photon number. As a non-limiting example, for a number of photons that is more than a single photon by a defined factor, the amplitudes corresponding to the photons may be higher than the amplitude corresponding to a single photon by the same defined factor. For example, the amplitudes corresponding to three photons may be three times the amplitude corresponding to one photon.

In various embodiments, at 152, the plurality of light absorbing elements may be arranged to interact with the EM standing wave at a corresponding plurality of anti-nodes of the EM standing wave. A respective light absorbing element may be arranged to interact with a respective anti-node of the EM standing wave. Anti-nodes refer to points along the EM standing wave where the EM standing wave has maximum amplitude or maximum displacement. By arranging the plurality of light absorbing elements to interact with the anti-nodes of the EM standing wave, a regime or mode of operation of total light absorption may be achieved.

In various embodiments, the method may further include inducing a relative movement between the plurality of light absorbing elements and the EM standing wave to arrange the plurality of light absorbing elements to interact with the EM standing wave at a corresponding plurality of nodes of the EM standing wave. For example, the plurality of light absorbing elements or the EM standing wave or both may be (physically) shifted relative to each other, e.g., by mechanically moving the light absorbing elements and/or changing the phase between interfering propagating waves (e.g., two counter-propagating waves) used to form the EM standing wave. As non-limiting examples, these may be achieved via a nanopositioner or a phase shifter. Nodes refer to points along the EM standing wave where the EM standing wave has minimum (or zero) amplitude or no displacement. By arranging the plurality of light absorbing elements to interact with the nodes of the EM standing wave, a regime or mode of operation of total light transmission may be achieved. In this way, the EM standing wave may be transmitted through or past the plurality of light absorbing elements.

Due to the flexibility of relative movement between the plurality of light absorbing elements and the EM standing wave, and, depending on the relative positioning of the plurality of light absorbing elements to the EM standing wave, it is possible to switch between the two regimes or modes of operation of total light absorption and total light transmission.

In various embodiments, for each spacing between respective two adjacent light absorbing elements of the plurality of light absorbing elements, the spacing may be equal to a whole number of half of a wavelength of the electromagnetic standing wave. In other words, the spacing between two adjacent or neighbouring light absorbing elements may be equal to the whole number of $\lambda/2$, where $\lambda$ is the wavelength of the EM standing wave.

In various embodiments, the EM standing wave may be or may include a free space EM standing wave.

In various embodiments, the method may further include interacting two counter-propagating waves cooperatively (e.g., by interference) with each other to form the electromagnetic standing wave. The two counter-propagating waves travel or propagate in opposite directions.

In various embodiments, the two counter-propagating waves may be generated from an EM travelling wave. The EM travelling wave may be (optically) split into the two counter-propagating waves.

In various embodiments, the method may further include generating, from an EM travelling wave, a (back-) reflected propagating wave, wherein the EM travelling wave and the reflected propagating wave define the two counter-propagating waves.

As described above, therefore, an EM travelling wave may be transformed to the EM standing wave. The EM travelling wave may be transformed to the EM standing wave prior to arranging the plurality of light absorbing elements to interact with the EM standing wave.

In various embodiments, the two counter-propagating waves may be propagated in (or through) a (optical) waveguide structure for the two counter-propagating waves to interact cooperatively with each other in the waveguide structure to optically confine the EM standing wave in (or within) the waveguide structure (e.g., confined in a waveguide core of the waveguide structure), wherein the plurality of light absorbing elements may be arranged optically coupled to the waveguide structure. For example, the plurality of light absorbing elements may be arranged on the waveguide structure or on the waveguide core. As non-limiting examples, the waveguide structure may be or may include a planar waveguide or a rib waveguide.

In various embodiments, the two counter-propagating waves may be propagated through respective two optical fibers arranged spaced apart from each other for the two counter-propagating waves to interact cooperatively with each other in a spacing between the two optical fibers, and the plurality of light absorbing elements may be arranged in the spacing. This may mean that one of the two counter-propagating waves may propagate in or through a first optical fiber, and the other of the two counter-propagating waves may propagate in or through a second optical fiber, where the first and second optical fibers may be arranged with a gap therebetween for the plurality of light absorbing elements to be received therein. As a non-limiting example, the plurality of light absorbing elements may be arranged adjacent to the fiber end facets of the two optical fibers.

The method may further include arranging a plurality of optically transparent physical spacers (relative to the plurality of light absorbing elements), wherein a respective optically transparent physical spacer of the plurality of optically transparent physical spacers may be arranged in between respective two adjacent light absorbing elements of the plurality of light absorbing elements. A non-limiting example of an optically transparent physical spacer may include a transparent dielectric element or layer. Non-limiting examples for the transparent dielectric element may include silica ($SiO_2$), silicon nitride ($Si_3N_4$), and different glass materials.

In various embodiments, a respective space in between respective two adjacent light absorbing elements of the plurality of light absorbing elements may be defined by vacuum or air.

In various embodiments, each of the plurality of light absorbing elements may include a superconducting nanowire single-photon detector (SNSPD), a superconducting microwire single-photon detector (SMSPD), a superconducting film of a transition edge sensor (TES), a p-n junction of a single photon avalanche diode (SPAD), a photocathode of a photomultiplier tube (PMT), a gain region of a visible light photon counter (VLPC), or a solid-state photomultiplier (SSPM). Nevertheless, it should be appreciated that any other types of photodetectors may also be used. Non-limiting examples of materials that may be used for each of the plurality of light absorbing elements may include silicon (Si), germanium (Ge), and other III-V elements.

Figure 1B:
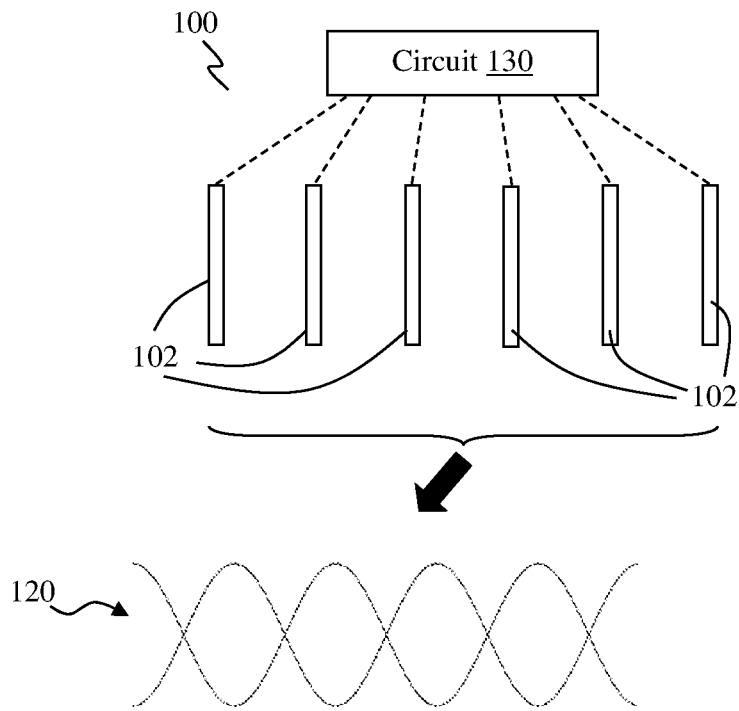
FIG. 1B shows a schematic view of a photon detector arrangement, according to various embodiments.

FIG. 1B shows a schematic view of a photon detector arrangement 100, according to various embodiments. The photon detector arrangement 100 includes a plurality of light absorbing elements 102 configured to be arranged spaced apart from each other to interact (as shown by the block arrow) with an electromagnetic standing wave 120 at a corresponding plurality of points of the electromagnetic standing wave 120 to absorb at least part of the electromagnetic standing wave 120, and a circuit 130 configured to be electrically coupled (as shown by the dashed lines) to the plurality of light absorbing elements 102, the circuit 130 being configured to detect electrical signals generated in response to the absorption to detect photons corresponding to the electromagnetic standing wave 120. While six light absorbing elements 102 are shown in FIG. 1B, it should be appreciated that, depending on applications and/or requirements, a lower or higher number of light absorbing elements 102 may be provided. In various embodiments, the circuit 130 may be defined by a plurality of sub-circuits, where a respective sub-circuit of the plurality of sub-circuits may be electrically coupled to a respective light absorbing element of the plurality of light absorbing elements 102.

The circuit 130 may further be configured to determine a quantity (or number) of the photons based on the electrical signals.

It should be appreciated that description corresponding to the method of detecting photons in the context of the flow chart 150 may correspondingly be applicable in relation to the photon detector arrangement 100.

Various embodiments will now be further described by way of the following non-limiting examples. Various embodiments may address the problem of multiple photon absorption. In various embodiments, light absorption happens in the absorptive layers.

Figure 2A:
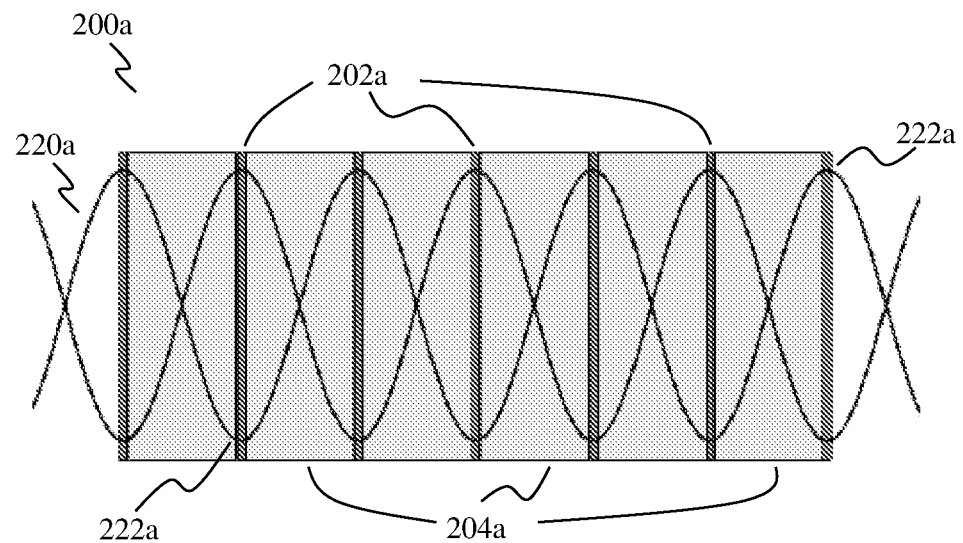
FIG. 2A shows a schematic diagram illustrating a design of photon number resolving detection of a standing wave in the regime of total light absorption, according to various embodiments.

Coherent perfect absorption (CPA) is a process of standing wave absorption by a thin film, and may be extended to the regime of a single photon absorption. A further regime of distributed CPA may be enabled, where a single highly absorptive layer is replaced by multiple spatially separated weakly absorptive layers. The techniques disclosed herein exploit distributed CPA for photon number detection and/or resolution application (e.g., CPA based photon number resolving detector, CPA-PNRD), as illustrated in FIG. 2A. The detector 200a may include a 1D array of active layers (or light absorbing elements) (three active layers are illustratively shown labelled as 202a) spatially separated by transparent spacers (three transparent spacers are illustratively shown labelled as 204a) which may include but not limited to vacuum, air, transparent dielectric, etc. Therefore, adjacent active layers 202a may be separated by a transparent spacer 204a. The active layers 202a are the light absorbing part of the detector 200a. As non-limiting examples, one or more active layers (or light absorbing elements) 202a may be a superconducting nanowire of a superconducting nanowire single-photon detector (SNSPD) or a superconducting film of a transition edge sensor (TES). A superconducting film is a thin film of a superconducting material (e.g., niobium nitride (NbN), niobium titanium nitride (NbTiN), tungsten (W), tungsten silicide (WSi), molybdenum silicide (MoSi), aluminum and others) operating below critical temperature. A superconducting nanowire is a nanowire (wire with nanometer scale thickness and width) fabricated from the superconducting film.

While seven light absorbing elements (or active layers) 202a are shown in FIG. 2A, it should be appreciated that any lower or higher number of light absorbing elements 202a may be provided. The number of active layers 202a may be arbitrary. In various embodiments, the number of active layers 202a may be defined by the maximum number of photons to be detected. A non-limiting example of the procedure for defining the parameters of the detector may include: (i) define the maximum number ($N_{max}$) of photons to be detected, (ii) the number of active layers (M) should be at least equal to $N_{max}$ but, depending on specific application, may require $M \gg N_{max}$, (iii) after M is defined, Equations (2)-(4), to be described further below, may be used to determine the required optical response of each individual active layer using M.

As shown in FIG. 2A, the active layers 202a are placed or arranged at different anti-nodes (two anti-nodes are illustratively shown labelled as 222a) of a detectable (electromagnetic; EM) standing wave 220a which may enable uniform light absorption probability. The anti-nodes 222a are points on the stationary wave 220a that oscillate with maximum amplitude. As a result of light absorption, the active layers 202a, which may be electrically coupled to or may be part of an external electric circuit, generates an electrical output signal. The regime of total light absorption is achieved by placing (all) the active layers 202a at the anti-nodes 222a of the EM standing wave 220a as shown in FIG. 2A.

The active layers (or absorptive layers) 202a may be of a subwavelength thickness (i.e., the thickness is smaller or much smaller than the optical wavelength of the detected light) as otherwise it may not be possible to place the layers 202a at the anti-nodes or nodes of the standing wave 220a.

Figure 2B:
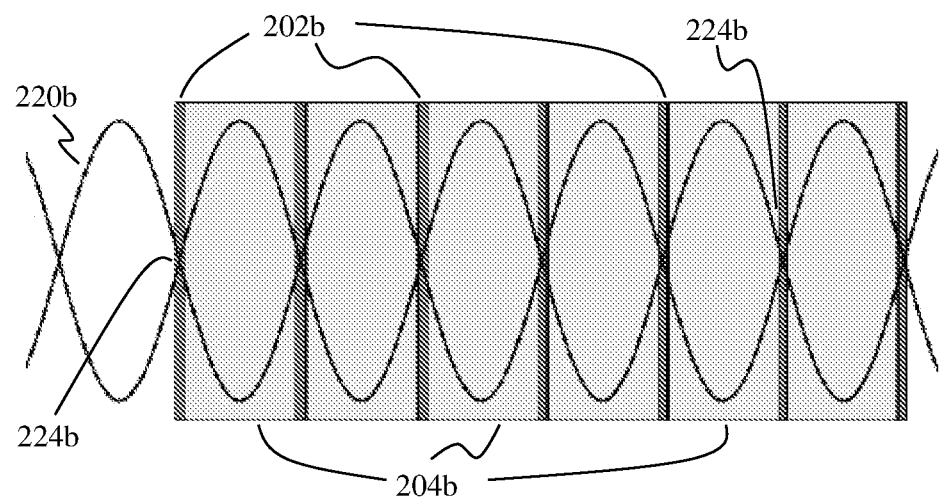
FIG. 2B shows a schematic diagram illustrating a design of photon number resolving detection of a standing wave in the regime of total light transmission, according to various embodiments.

FIG. 2B shows a schematic diagram illustrating a design of photon number resolving detection of a (electromagnetic; EM) standing wave 220b in the regime of total light transmission. This is achieved by placing or arranging (all) active layers (or light absorbing elements or layers) (three active layers are illustratively shown labelled as 202b) at the nodes (two nodes are illustratively shown labelled as 224b) of the standing wave 220b. The nodes 224b are points of zero amplitude on the stationary wave 220b. One or more active layers 202b may be a superconducting nanowire of a SNSPD or a superconducting film of a TES. While seven light absorbing elements (or active layers) 202b are shown in FIG. 2B, it should be appreciated that any lower or higher number of light absorbing elements 202b may be provided. Adjacent active layers 202b may be separated by a transparent spacer (three transparent spacers are illustratively shown labeled as 204b) which may include but not limited to vacuum, air, transparent dielectric, etc.

The detector of various embodiments, including the detector 200a, may be switched between operation in the regime of total light absorption in the context of FIG. 2A and in the regime of total light transmission in the context of FIG. 2B. The ability to switch between these regimes enables in-line operation of the device (e.g., see FIGS. 2A and 2B). "In-line" refers to "on the fly", meaning that one can choose to detect light using the regime of total light absorption or let the light go through the detector using the regime of total light transmission. The choice may be conditioned by the results of light transformation in the preceding parts of the optical network.

Nevertheless, it should be appreciated that the detector 200a may be operated for partial light absorption for photon detection or resolution. This may mean that the light absorbing elements 202a may be arranged to interact with the EM standing wave 220a, 220b at points that are in between the anti-nodes 222a and the nodes 224b.

The techniques disclosed herein may allow for "phase sensitive" detection when the detector or detector arrangement is operated at the regimes of light absorption and light transmission, and "phase insensitive" detection when the detector is always at the total absorption regime (e.g., cannot be switched to transmission regime). The choice between phase sensitive and phase insensitive detection depends on the specific application.

Figure 3A:
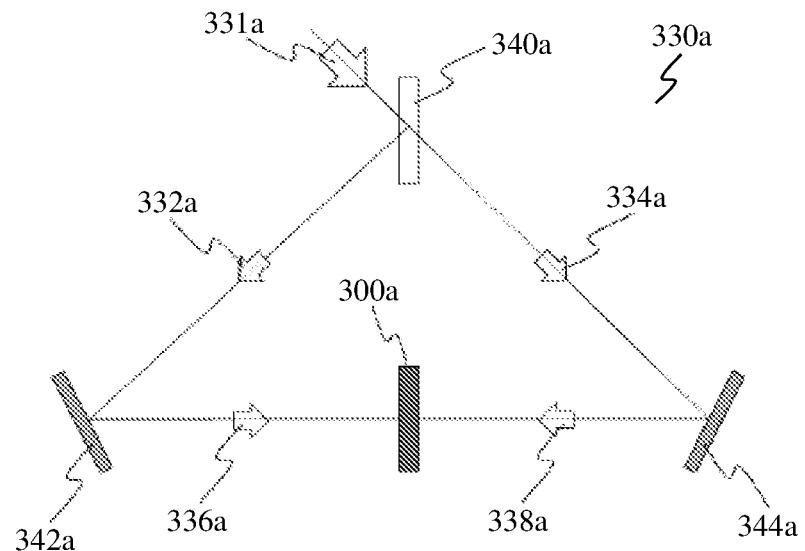
FIG. 3A shows a schematic diagram illustrating a design of travelling wave detection by CPA-PNRD (coherent perfect absorption-photon number resolving detector), according to various embodiments.

The techniques disclosed herein may also be applied to the detection of (EM) travelling waves, as illustrated in FIG. 3A for a detector arrangement or apparatus 330a. An input light, e.g., in the form of a travelling wave 331a, is transformed into a standing wave by splitting the input light 330a into two beams—a reflected beam 332a and a transmitted beam 334a—by a beamsplitter 340a, and counter propagating the beams 332a, 334a as respective beams 336a, 338a by using mirrors 342a, 344a. The counter propagating beams 336a, 338a (or counter-clockwise propagating mode 336a and clockwise propagating mode 338a) cooperatively create a standing wave. A CPA-PNRD (coherent perfect absorption-photon number resolving detector) 300a, which may be similar to the design shown in FIGS. 2A and 2B having multiple active layers or light absorbing elements 202a, 202b separated by spacers 204a, 204b, may be placed at the region where the standing wave is created. The technique of standing wave detection described herein may therefore be applied. By changing the relative position of the active layers of the detector 300a and the created standing wave (e.g., either by shifting the active layers and/or by changing the phase relation between the counter propagating waves 336a, 338a), it is possible to switch between the regime of total transmission (see FIG. 2B) and the regime of total absorption (see FIG. 2A).

To achieve the regime of total absorption of a standing wave, the absorber (detector), e.g., 200a, 300a, may be characterized by:

$$t = \pm r = \frac{1}{2} \qquad \text{Equation (1),}$$

where t and r are the amplitude transmission and reflection coefficients under travelling wave illumination. Thus, the CPA-PNRD, as a whole device, should transmit 25%, reflect 25% and absorb 50% of input light intensity when light is sent through for "phase sensitive" detection or "phase insensitive" detection. Further, an absorber (detector) with required parameters may be composed of M active layers spaced by the whole number of ½ (where λ is the wavelength of the input light) if $$t_l = \frac{M}{M+1}, \qquad \text{Equation (2)}$$

$$r_l = t_l - 1 = -\frac{1}{M+1}, \qquad \text{Equation (3)}$$

$$a_l^2 \equiv 1 - t_l^2 - r_l^2 = \frac{2M}{(M+1)^2}, \qquad \text{Equation (4)}$$

where $t_l$, $r_l$ and $a_l$ are the amplitude transmission, reflection and absorption coefficients of each active layer under travelling wave illumination. Identical optical response and spatial arrangement of the active layers may ensure uniform light absorption probability in each active layer, and, consequently, high performance photon number resolution. It should be appreciated that Equations (2)-(4) apply to the designs illustrated in FIG. 3A, and FIG. 3B to be discussed below.

The techniques disclosed herein is different compared to a known approach where the distance between active layers is chosen to increase the absorption bandwidth of the detector under travelling wave illumination. While the known approach ensures high detection efficiency, such an arrangement leads to uneven absorption of light in different active layers and not suitable for practical implementation of photon number resolution. Further, for the known approach, broadband absorption assumes a small spacing, otherwise the structure becomes sensitive to the wavelength.

Figure 3B:
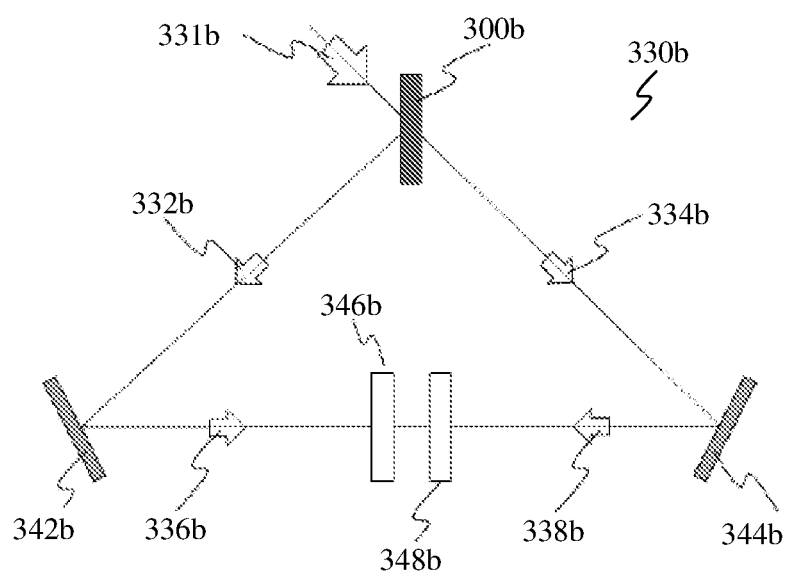
FIG. 3B shows a schematic diagram illustrating a design of phase-insensitive detection of travelling waves with CPA-PNRD (coherent perfect absorption-photon number resolving detector), according to various embodiments.

In embodiments where in-line operation may be optional or may not be needed (e.g., operation in the regime of total light transmission may be optional), the detection scheme may be modified to "phase insensitive" detection which always support the regime of total light absorption, e.g., based on the detector arrangement or apparatus 330b of FIG. 3B. An input light, e.g., in the form of an input travelling wave 331b illuminates a CPA-PNRD (coherent perfect absorption-photon number resolving detector) 300b, which may be similar to the design of the detector 200a of FIG. 2A having multiple active layers 202a separated by spacers 204a and having optical parameters according to Equations (2)-(4). 25% of the input light 331b is reflected resulting in a reflected beam 332b, 25% of the input light 331b is transmitted resulting in a transmitted beam 334b, and 50% of the input light 331b is absorbed by the detector 300b. The reflected beam (or light) 332b and the transmitted beam (or light) 334b light are counter propagated by the mirrors 342b, 344b, resulting in counter propagating beams 336b, 338b (or counter-clockwise propagating mode 336b and clockwise propagating mode 338b). The mirrors 342b, 344b may also direct the reflected and transmitted light beams 332b, 334b back to the CPA-PNRD 300b. Counter propagating beams (e.g., one travelling beam propagating clockwise and another travelling beam propagating counter-clockwise) cooperatively create a standing wave where the CPA-PNRD 300b is positioned. To absorb the rest of the light, a π-phase shift may be introduced between the light modes 336b, 338b propagating clockwise and counter-clockwise. This may be done passively by exploiting the idea of indefinite casual order. As a non-limiting example, a combination of a half wave plate 346b oriented at 0 degree and a half wave plate 348b oriented at 45 degrees relative to the horizontal axis (which is the axis perpendicular to the direction of light propagation and lying in the plane of FIG. 3B) introduces a π-phase shift between the counter-clockwise 336b and clockwise 338b propagating modes propagating in opposite directions passing through the half wave plates 346b, 348b. It should be appreciated that the positioning of the half wave plates 346b, 348b may be interchanged.

Figure 3C:
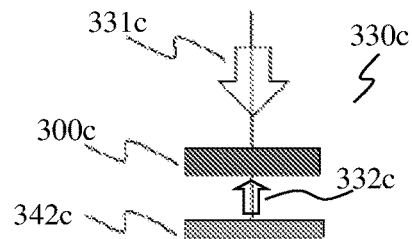
FIG. 3C shows a schematic diagram illustrating a design of phase-insensitive detection scheme of travelling waves with CPA-PNRD (coherent perfect absorption-photon number resolving detector), according to various embodiments.

The phase-insensitive detection scheme of various embodiments may also be implemented in the design shown in FIG. 3C for a detector arrangement or apparatus 330c. A detectable input (EM) travelling wave 331c is incident on a (perfect) mirror 342c. The mirror 342c may have close to 100% reflectivity. Non-limiting examples for the mirror 342c include any metal or dielectric mirror with reflectivity close to 100%. Interference of the input light beam 331c and the (back-)reflected light beam 332c results in the formation of a standing wave. A CPA-PNRD (coherent perfect absorption-photon number resolving detector) 300c is placed or arranged in the region where the standing wave is created. Accordingly, a standing wave is created by reflecting the input travelling wave 331c by the mirror 342c, and the CPA-PNRD 300c is placed in the region where the standing wave is generated. The CPA-PNRD 300c may be similar to the design shown in FIGS. 2A and 2B having multiple active layers 202a, 202b separated by spacers 204a, 204b. The regime of total absorption (or transmission) takes place if the active layers, e.g., 202a (or 202b) are placed at the anti-nodes (or the nodes) of the standing wave. Since the mirror 342c effectively doubles the number of the used active layers M, the optical parameters of the active layers may be found from Equations (2)-(4) by replacing M with 2M (i.e., M→2M).

Figure 3D:
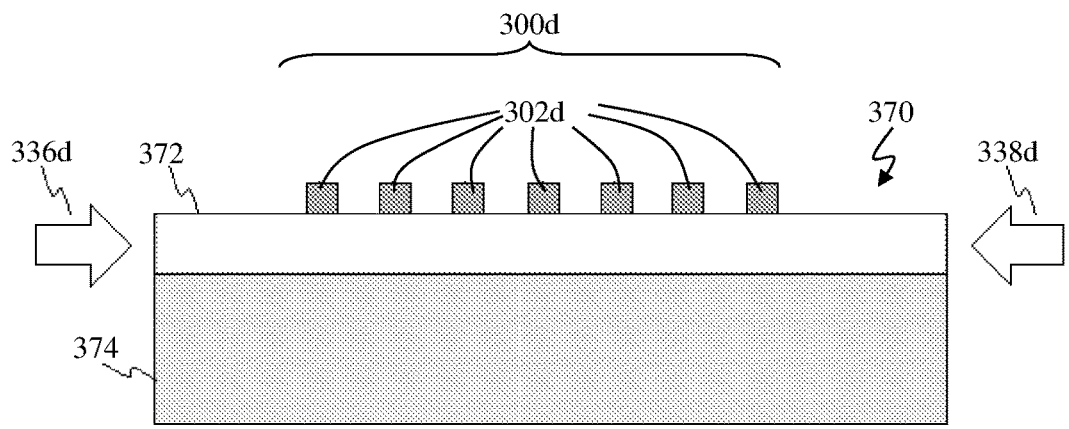
FIG. 3D shows a schematic diagram illustrating a cross-sectional view of a CPA-PNRD (coherent perfect absorption-photon number resolving detector) in a waveguide structure, according to various embodiments.

Light detection schemes, as described herein, may be implemented in free space or as part of an integrated platform including one or more waveguide structures (e.g., rib waveguides, etc.), and/or one or more optical fibers. The detector of various embodiments may be arranged in or on a waveguide structure. FIG. 3D shows a schematic diagram illustrating a cross-sectional view of a non-limiting example of a CPA-PNRD (coherent perfect absorption-photon number resolving detector) 300d in a waveguide structure 370. The light detection scheme may be implemented in a SOI (silicon-on-insulator) waveguide structure 370 having a silicon layer 372, acting as a waveguide core, fabricated on an insulator cladding layer 374. A standing wave (not shown) may be created by travelling waves (or light beams) 336d, 338d counter propagating in or through the waveguide core 372 placed at the top of the insulator layer 374. The standing wave created in the waveguide structure 370 is (optically) confined generally within the core 372. The CPA-PNRD 300d includes a plurality of light absorbing elements or active layers (e.g., detecting (nano-)wires) 302d placed across the waveguide structure 370, e.g., over or at the top of the waveguide core 372, to interact with the standing wave through evanescent field coupling. While seven light absorbing elements 302d are shown in FIG. 3D, it should be appreciated that any lower or higher number of active layers 302d may be provided. The separation between the light absorbing elements 302d may ensure that all of them are located either at the anti-nodes or the nodes of the standing wave depending on the phase relation of the incoming beams 336d, 338d allowing to achieve the regimes of full absorption as illustrated in FIG. 2A or full transmission as illustrated in FIG. 2B. Implementation of interferometer or cavity configurations for light detection may also be possible within the waveguide platform.

In further embodiments, active layers may be fabricated on a fiber end facet in the configuration illustrated in FIGS. 2A and 2B, allowing photon number resolving detection directly within an optical fiber.

Figure 3E:
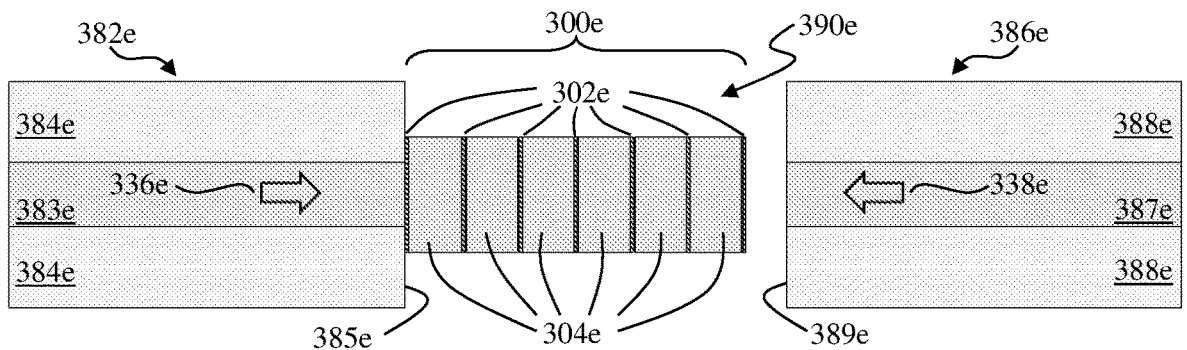
FIG. 3E shows a schematic diagram illustrating a cross-sectional view of a CPA-PNRD (coherent perfect absorption-photon number resolving detector) arranged in between two optical fibers.

FIG. 3E shows a schematic diagram illustrating a cross-sectional view of a non-limiting example of a CPA-PNRD (coherent perfect absorption-photon number resolving detector) 300e fabricated in between two optical fibers 382e, 386e. The light detection scheme may be implemented using optical fibers 382e, 386e, each having a waveguiding core 383e, 387e, surrounded by a cladding 384e, 388e. The optical fibers 382e, 386e may be arranged spaced apart from each other with a spacing or gap 390e therebetween. A (EM) standing wave (not shown) may be created by travelling waves (or light beams) 336e, 338e counter propagating in or through the cores 383e, 387e of the optical fibers 382e, 386e. The standing wave may be created in between the optical fibers 382e, 386e, in the space 390e, for example, in between the two fiber end facets 385e, 389e. The CPA-PNRD 300e includes a plurality of light absorbing elements or active layers (e.g., detecting (nano-)wires) 302e placed in between the optical fiber end facets 385e, 389e to interact with the standing wave. As a non-limiting example, the CPA-PNRD 300e may be fabricated on one of the fiber end facets (e.g., facet 385e) and an index matching gel may be used to fill the rest of the space 390e between the fiber end facets 385e, 389e, to interact with the standing wave. The active layers 302e may be separated by spacers 304e. While seven light absorbing elements 302e are shown in FIG. 3E, it should be appreciated that any lower or higher number of active layers 302e may be provided. The separation between the light absorbing elements 302e may ensure that all of them are located either at the anti-nodes or the nodes of the standing wave depending on the phase relation of the incoming beams 336e, 338e allowing to achieve the regimes of full absorption as illustrated in FIG. 2A or full transmission as illustrated in FIG. 2B. Implementation of interferometer or cavity configurations for light detection may also be possible within the optical fiber platform.

It should be appreciated that any one of designs illustrated in FIGS. 3A to 3C may be combined with any one of designs illustrated in FIGS. 3D and 3E.

The techniques disclosed herein may include one or more of the following features.

1) Method of photon number resolving detection free of optical mode multiplication. Known approaches to photon number discrimination are based on multiplication of optical modes. In contrast, various embodiments are based on detection of a single optical mode (standing wave) by multiple light absorbing elements or active layers of the detector. Detection without multiplication of optical modes may allow to avoid such problems as slowdown of operational rate, decrease of system detection efficiency due to additional optical components and non-uniform illumination of different active layers of the detector.

2) Concept of detection based on distributed CPA. Various embodiments provide or employ the concept of photo detection based on the effect of distributed CPA where quantum (or classical) light is absorbed by multiple spatially separated light absorbing elements or active layers of the detector. Since different active layers operate independently, this approach does not or may not slow down the operational rate and jitter of the device. Moreover, distributed CPA may allow to achieve the regime of deterministic light absorption by optimizing the optical response of individual active layers of the detector. This approach does not require optical cavities to increase absorption. With the active layers operating independently, photon absorption by an active layer does not "disturb" operation of other active layers which still can absorb light. Also, each active layer may have its own readout electric circuitry.

3) Detection of (EM) standing waves in free space and integrated platforms. Detection of standing waves allows to detect single optical mode by multiple detectors. By its nature, standing wave guarantees uniform exposure of different active layers placed at the antinodes of the standing wave. Travelling waves may be detected by the method of various embodiments as well by converting them into standing waves prior to the detection.

4) Deterministic light absorption (e.g., efficiency=100%) with weakly absorbing active layers. Known methods of photon number discrimination require deterministic light absorption by each constituting of the detector. For instance, in space multiplication, each pixel of the 2D array should absorb 100% of the light which is difficult to achieve practically. In contrast, one or more detectors with 100% detection efficiency may be achieved in the techniques disclosed herein by exploiting weakly absorbing light absorbing elements or active layers. This may allow using a wide range of materials not suitable for known detection schemes due to their weak absorption.

5) In-line operation of the detector with an option to bypass the detector. Known detectors do not offer flexibility in the optical scheme of the setup: detectors prevent further propagation of quantum light. In the CPA configuration described herein, quantum light absorption may be modulated between the regimes of total light absorption (active layers placed at the antinodes of the standing wave) and total light transmission (active layers placed at the nodes of the standing wave). One can choose either to detect light or let it pass through the detector by changing the relative position of the active layers and the standing wave (e.g., by shifting the phase between two counter propagating waves and/or by mechanically shifting the absorbing layers). The ability to operate between deterministic detection and deterministic transmission regimes (in-line operation) would be beneficial for feed forward protocols of quantum information processing, where results of previous stages of the protocols dictate the following stages.

6) Direct measurement of superposition states. Known detection of travelling waves are restricted by detection of a single spatial mode only (for instance, light propagating through a single fiber). In contrast, the CPA-PNRD of various embodiments may allow to directly measure superposition states of two spatial modes which may be used to simplify detection schemes in quantum information protocols. Measurement of superposition states of qubits may reduce the number of required optical components increasing overall efficiency of the protocols.

In terms of possible commercialization, the CPA-PNRD according to the techniques disclosed herein may offer multiple applications in quantum optics and quantum information including linear optical quantum computation, quantum communication, intensity correlation measurements, quantum light sources characterization, quantum metrology, etc. Besides, as an extremely sensitive sensor, the CPA-PNRD of various embodiments may also be used in classical weak light measurement applications such as satellite communications, lidar sensors, astronomy, atmospheric pollution monitoring, explosive detection, medicine, etc.

As described above, various embodiments may relate to a method for the resolution of a number of photons without optical mode multiplication and an apparatus to perform the method.

For the known time multiplication approach, an incoming light pulse is split into a sequence of pulses and each pulse is detected by one or more detectors one at a time. This approach decreases the operational rate and introduces losses due to additional optical components and delay line loops requirements. For the known space multiplication approach, incoming light is spread in multiple transverse spatial modes corresponding to pixel size and sent to a 2D array of single-photon detectors. While this approach allows full exploitation of the fast temporal response of the detector and does not require additional optical components in the detection scheme, it suffers from non-uniform illumination of different detectors in the 2D array (typically the central pixels are exposed to higher light intensities due to the Gaussian profile of the illuminating beam in the transverse direction), which impairs photon number resolution effectiveness. Moreover, the spacing of neighboring pixels introduces additional losses as well. There are, therefore, limitations to the time multiplication and space multiplication approaches.

Various embodiments may explore distributed coherent perfect absorption by thin active layers.

Various embodiments may provide a method of or for detecting number of photons, including:
  a) transforming (EM) travelling wave to (EM) standing wave; and
  b) detection of the standing wave by placing multiple active layers at the anti-nodes of the standing wave (total light absorption); or c) transmitting the standing wave by placing multiple active layers at the nodes of the standing wave (total light transmission); and d) the active layers are spatially separated by optically transparent spacers.

To switch from light absorption to light transmission, either the active layers or the standing wave may be physically shifted relative to each other (for example, via a nanopositioner or a phase shifter).

The active layers are a light absorbing part of the detector. As non-limiting examples, each of the active layers may be a superconducting nanowire single-photon detector (SNSPD), a superconducting microwire single-photon detector (SMSPD), a superconducting film of a transition edge sensor (TES), a p-n junction of a single photon avalanche diode (SPAD), a photocathode of a photomultiplier tube (PMT) or a gain region of a visible light photon counter (VLPC) or a solid-state photomultiplier (SSPM).

Calculation of the Required Optical Response of the Detector with Multiple Active Layers for CPA-PNRD To achieve the regimes of coherent perfect absorption (CPA) and coherent perfect transmission (CPT) with a single-layer absorber (detector) of a subwavelength thickness, the absorber should be characterized by a 50% absorption under a travelling wave illumination with reflection, r, and transmission, t, coefficients, satisfying $$t=-r=\tfrac{1}{2} \text{ or } t=r=-\tfrac{1}{2} \qquad \text{Equation (5)}.$$

Now, instead of a single-layer absorber (detector), a bi-layered absorber (detector) may be considered with M=2. Each layer may be characterized by its amplitude transmission, $t_1$ and $t_2$, and reflection, $r_1$ and $r_2$, coefficients ($t_1$ and $r_1$ are associated with layer 1 and $t_2$ and $r_2$ are associated with layer 2), and for any thin absorber it is valid:

$$r_1=t_1-1, r_2=t_2-1 \qquad \text{Equation (6)}.$$

Optical properties of the whole structure are defined as $$t = \frac{t_1 t_2 e^{ikD}}{1 - r_1 r_2 e^{2ikD}}, \qquad \text{Equation (7)}$$

$$r' = r_1 + \frac{r_2 t_1^2 e^{2ikD}}{1 - r_1 r_2 e^{2ikD}}, \qquad \text{Equation (8)}$$

$$r'' = r_2 + \frac{r_1 t_2^2 e^{2ikD}}{1 - r_1 r_2 e^{2ikD}}, \qquad \text{Equation (9)}$$

where D is the distance between the layers, t, r' and r" are the total amplitude transmission and reflection (for illumination from the left and right side) coefficients. Setting D=0 leads back to the condition of a single-layer absorber (detector), Equation (5), providing additional relations between the optical properties of the layers, namely, $$t=\tfrac{1}{2}, r'=r''=-\tfrac{1}{2} \qquad \text{Equation (10)}.$$

Therefore, combining Equations (6)-(10) leads to:

$$t_2 = \frac{t_1}{3t_1 - 1}. \qquad \text{Equation (11)}$$

Letting $t_1$ vary as a free parameter and assuming that the layers are identical (please see FIG. 4A showing a schematic diagram illustrating a model of a bi-layered absorber 470) lead to $$t_1=t_2=\tfrac{2}{3} \text{ and } r_1=r_2=-\tfrac{1}{3} \qquad \text{Equation (12)}.$$

The bi-layered absorber (detector) 470 includes two identical layers 472, 474 with transmission coefficient $t_1=\tfrac{2}{3}$ and reflection coefficient $r_1=-\tfrac{1}{3}$ spaced by a variable distance D. Input monochromatic field 476 with amplitude $E_0$ is partially transmitted (with amplitude $tE_0$) 477 and partially reflected (with amplitude $rE_0$) 478.

The optical response of such a system of FIG. 4A is shown in FIGS. 4B and 4C as a function of the distance D between the layers of a bi-layered system expressed in units of the wavelength λ. FIG. 4B shows the intensity transmission $|t|^2$ 480, reflection $|r|^2$ 481 and absorption $|a|^2=1-|t|^2-|r|^2$ 482 coefficients of the structure as a function of the distance D, while FIG. 4C shows the phases of transmission 485 and reflection 486 coefficients of the structure as a function of the distance D. Distance is expressed in units of the wavelength λ. Diamonds, indicated in FIGS. 4B and 4C, correspond to the regime with $t=-r=\tfrac{1}{2}$, while circles correspond to $t=r=-\tfrac{1}{2}$ (it should be appreciated that t and r are amplitude transmission and reflection coefficients, and may be complex numbers in general (in this case, negative, as represented by the sign "−")). In both cases, the bi-layered absorber (detector) may deterministically absorb a standing wave.

To generalize to the case when the two absorbing layers 472, 474 are separated by a transparent spacer with refractive index $n_{sp}$, the distance D may be as follows:

$$D = \frac{\lambda}{2n_{sp}} \cdot N. \qquad \text{Equation (13)}$$

For a multi-component system with M>2, relations similar to Equation (11) may become more complicated with a number of free parameters. The solution may be simplified for the preferred or important case of M identical layers (as it may be one of the requirements for the PNRDs). Following a similar procedure leads to:

$$t_m = \frac{M}{M+1}, \qquad \text{Equation (14)}$$

$$r_m = t_m - 1 = -\frac{1}{M+1}, \qquad \text{Equation (15)}$$

$$a_m^2 \equiv 1 - t_m^2 - r_m^2 = \frac{2M}{(M+1)^2}, \qquad \text{Equation (16)}$$

where $t_m$ and $r_m$ are the amplitude transmission and reflection coefficients of the $m^{th}$ layer, and $a_m^2$ defines the intensity absorption coefficient (or probability of photon absorption) by each layer of absorber (or detector). For example, four layers with transmission and reflection coefficients of $\tfrac{4}{5}$ and $-\tfrac{1}{5}$, respectively, spaced by an integer number of λ, may have properties of the coherent perfect absorber with total (i.e., whole structure) transmission and reflection coefficients equal to $-\tfrac{1}{2}$, and, properly placed, will absorb the standing wave deterministically despite the fact that each layer is characterized by 0.32 probability of photon absorption. In other words, if a whole structure (all 4 layers) is illuminated by a travelling light, then the above-mentioned transmission and reflection coefficients may be expected.

Thus, by adjusting the parameters of individual layers and their spatial arrangement, it may be possible to assemble a structure with an optical response identical to a single layer absorber (detector) according to Equation (5).

Experimental Demonstration: Coherent Absorption and Coherent Transmission of a Single Photon by a Distributed Bi-Layered Absorber The method of photon detection may be tested by using absorbing metal thin films. The optical properties of these films are close to the optical properties of materials used, for instance, in the fabrication of SNSPDs. The difference with the actual photon detector is that electrical signals are not generated as the result of photon absorption. Otherwise, this experimental demonstration replicates the techniques disclosed herein.

Based on the inventors' analysis, a bi-layered absorber has been manufactured and single photon absorption with efficiency close to unity has been demonstrated. The layers of the bi-layered absorber may be represented by ultrathin layers of chromium with optical response close to that of Equation (12). Two chromium layers may be deposited on opposite sides of a supporting substrate by thermal evaporation. The layers' thickness may be adjusted empirically starting from a nominal value of 5 nm. As a substrate, a commercially available silicon nitride membrane of thickness $D_{SiN}$=200 nm may be used, which is approximately $\lambda/2n_{sp}$, at the wavelength of interest of 810 nm (considering $n_{sp} \approx 2.02$).

Figure 5A:
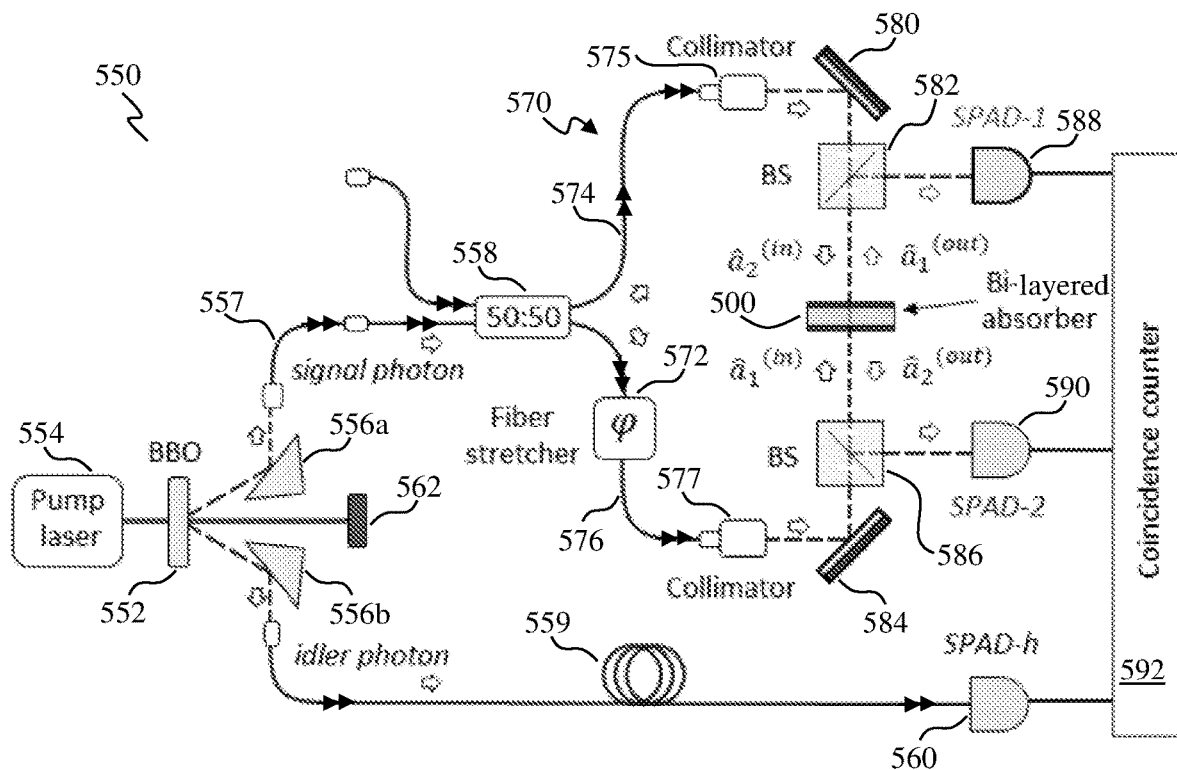
FIGS. 5A and 5B show a setup and results respectively relating to coherent absorption of heralded single photons by a bi-layered system.

FIG. 5A shows a schematic diagram of a setup 550 with a bi-layered absorber 500 (having two absorbing layers (or light absorbing elements)) placed in the middle of an interferometer 570. In FIG. 5A, lines with double-headed arrows and dashed lines correspond respectively to the optical fiber and free-space paths of the photons (indicated by open arrows). Degenerate spontaneous parametric down-conversion in a BBO crystal 552, induced by a pump laser (e.g., 405 nm laser) 554, may be used to generate pairs of time-correlated photons. This creates a signal photon that is reflected by a reflector 556a and optically coupled into a fiber 557, and an idler photon that is reflected by a reflector 556b and optically coupled into a fiber 559 and detected by a detector, e.g., a single-photon avalanche photodiode (SPAD-h) 560. A beam dumper 562 is provided to stop the beam of the pump laser 554. Detection of the idler photon by SPAD-h 560 heralds the presence of the signal photon. The signal photon is split on a beamsplitter (e.g., a 50:50 beamsplitter) 558 so that it may interfere with itself in the middle of the interferometer 570 creating a standing wave. The phase of the interferometer φ is repeatedly varied by a fiber stretcher 572 (for changing the relative position of the standing wave and the bi-layered absorber 500). The fiber stretcher 572 may be controlled by a ramp voltage at 1 Hz modulation frequency and amplitude 9 Vpp, which may ensure a fiber length modulation greater than 2λ in every cycle. The coherence length of heralded photons (~100 μm) may be much greater than $D_{SiN}$. The split photon, after the beamsplitter 558 propagates through respective fibers 574, 576 to respective collimators 575, 577. From the collimator 575, the corresponding photon is reflected by a reflector 580 to a beamsplitter 582, and from the collimator 577, the corresponding photon is reflected by another reflector 584 to another beamsplitter 586. The photons directed by the reflectors 580, 584 lead to counter propagating beams which cooperatively create a (EM) standing wave and the bi-layered absorber 500 interacts with the standing wave. The bi-layered absorber 500 functions to modulate photon absorption between the regimes of total light absorption and total light transmission (depending on the position of the active layers relative to the standing wave). Each (active) layer absorbs the photon with equal probability. The beamsplitters 582, 586 are used to direct the outgoing photons to two detectors, e.g., single-photon avalanche photodiodes (SPAD-1 and SPAD-2) 588, 590. Coincidence counts, recorded using a coincidence counter 892, between the detectors SPAD-1 588/SPAD-h 560 ($N_1$) and SPAD-2 590/SPAD-h 560 ($N_2$) are measured as a function of the phase φ (acquisition time may be about 20 ms and data may be averaged over more than 50 phase cycles). To evaluate the probability of single photon detection by SPAD-1 588 ($P_1$) and SPAD-2 590 ($P_2$), the average total input photon flux may be used as a reference:

$$P_{1,2}(\varphi) = \frac{N_{1,2}(\varphi)[\text{with absorber}]}{N_1[\text{without absorber}] + N_2[\text{without absorber}]}. \quad \text{Equation (17)}$$

The setup 550 may be used for photon number resolving detection.

Figure 5B:
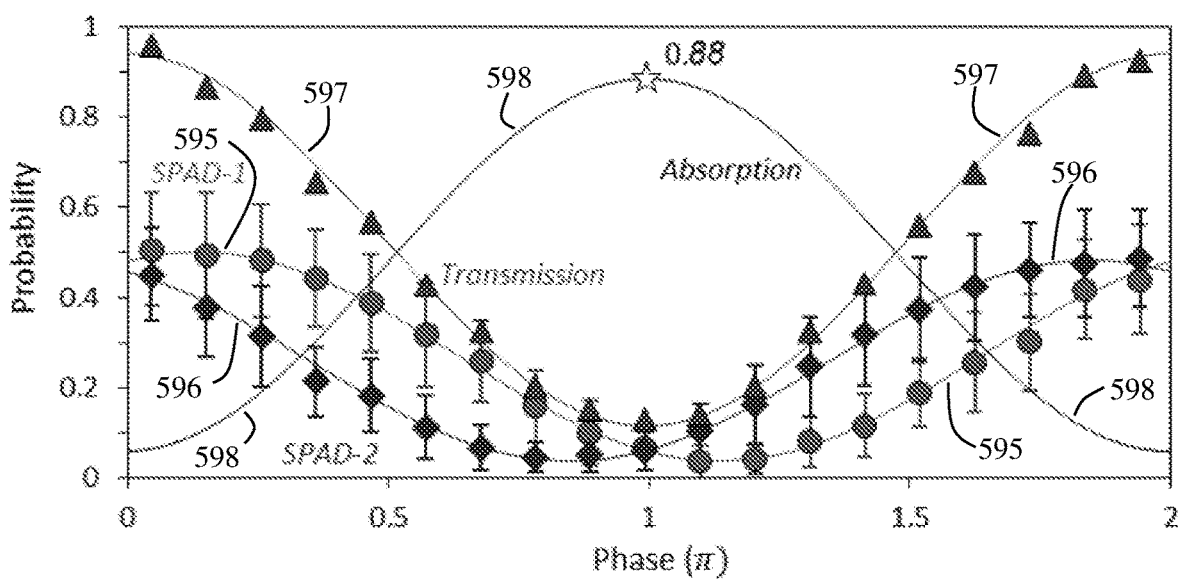

FIG. 5B shows the measured probabilities of photon detection by SPAD-1 588 (see circles and fitting line 595) and SPAD-2 590 (see diamonds and fitting line 596), total transmission (see triangles and fitting line 597) and total absorption (see black line 598) probabilities as a function of phase delay V between the two arms of the interferometer 570. The error bars represent the Poisson noise of randomly arriving photons. The highest photon absorption probability of 0.88 is marked by the white star in FIG. 5B.

The measured single-channel probabilities of photon detection (see results 595, 596) exhibit visibilities ≈87% and oscillate almost in phase with a small shift of less than 0.3π. Visibility of the total transmission probability, shown by the result 597 is around 78%, demonstrating high contrast modulation between the regimes of coherent total transmission and coherent total absorption. Total probability of single-photon absorption is shown by the result line 598 in FIG. 5B. In the regime of total absorption, single photon is coupled to the bi-layered system with a probability of 88% (shown by the white star in FIG. 5B). As described earlier, the advantage of coherent illumination becomes even more obvious when the number of active layers increases: the coupling efficiency may not or does not change under coherent illumination and may still reach 100% for high-dimensional systems.

Calculation of a Practical (or Realistic) Detector

As a close to practical realisation example, the optical responses of a single-layered superconducting nanowire single-photon detector (SNSPD) detector and a ten-layered SNSPD detector may be compared. The detection of light may be considered at a wavelength of λ=1550 nm where the active layers may be fabricated out of niobium titanium nitride (NbTiN) with a refractive index of 4.74-5.47i. Active layers may be separated by silica layers of thickness $\lambda/(2n_{SiO_2})$=516 nm=($n_{SiO_2}$=1.5). The same silica layers may be assumed to be on both sides of the structure so that the total interface is air-silica-NbTiN-silica-NbTiN- . . . -NbTiN-silica-air. The thickness of each NbTiN layer may be set to about 6 nm. As a parameter of the problem, the filling factor of the SNSPD nanowire may be used where the effective index method is used to evaluate the effective optical constants of the active layer. Using the transfer matrix method, the optical parameters of the structures may be obtained.

Figure 6A:
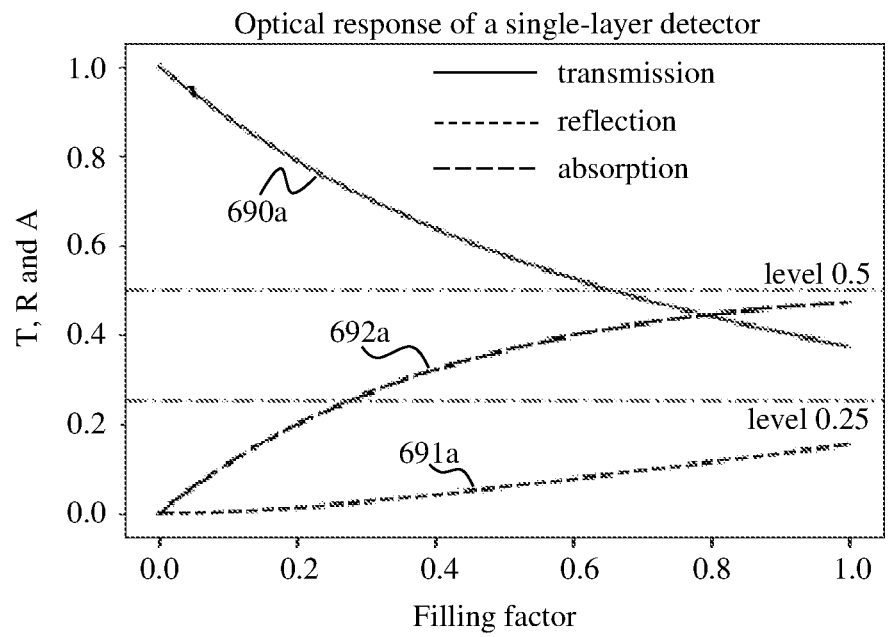
FIGS. 6A and 6B show results for the optical response of a single-layered superconducting nanowire single-photon detector (SNSPD).
Figure 6B:
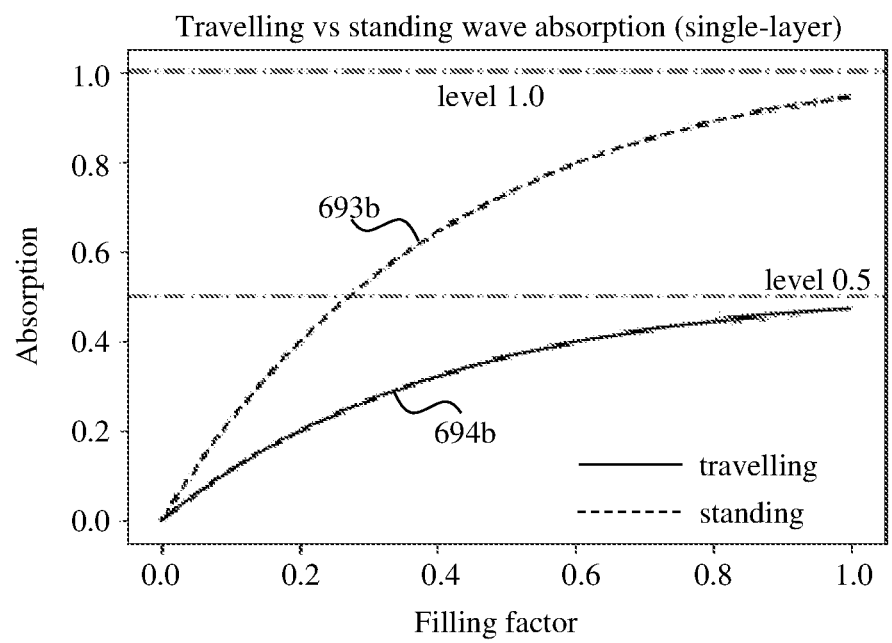

In FIG. 6A, the results of the calculation for the transmission (T) 690a, reflection (R) 691a, and absorption (A) 692a coefficients of a single-layered SNSPD detector are shown. With an increase of the filling factor, the absorption 692a tends to the maximum level of 0.5. At the same time, as may be observed from the calculation for absorption shown in FIG. 6B, the maximum absorption of a standing wave (see result 693b) tends to values close to unity, compared to that of a travelling wave (see result 694b) approaching to values close to 0.5.

Figure 6C:
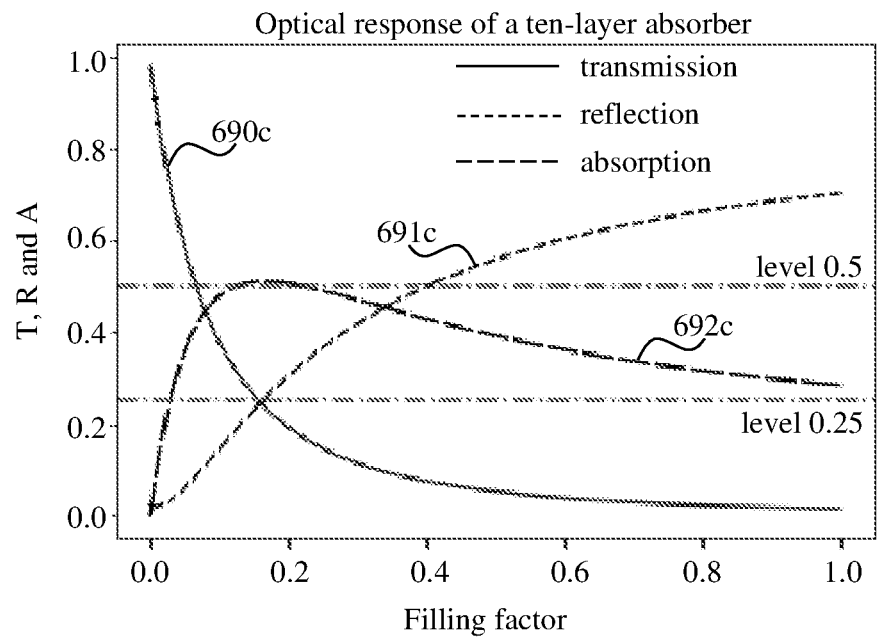
FIGS. 6C and 6D show results for the optical response of a ten-layered superconducting nanowire single-photon detector (SNSPD).
Figure 6D:
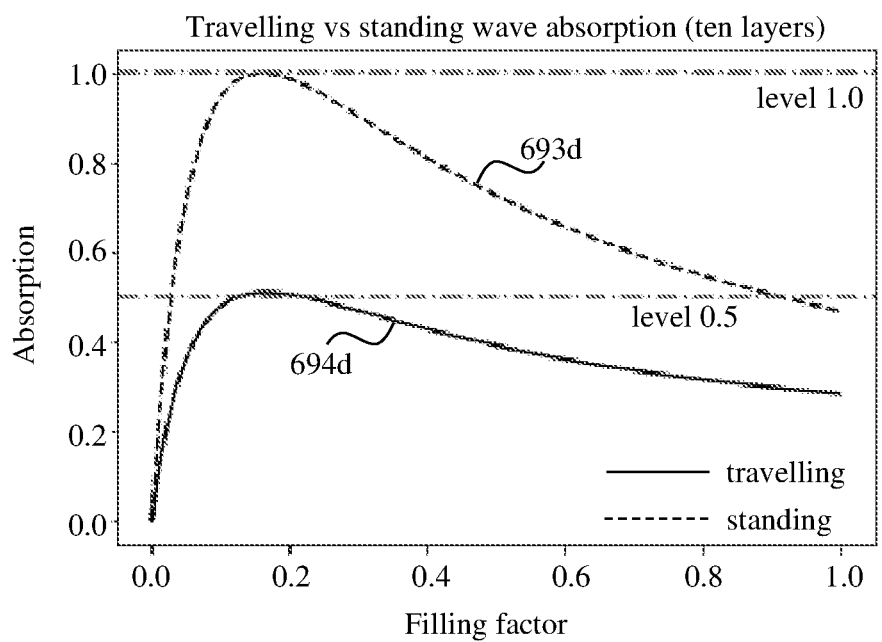

FIG. 6C shows the results of the calculation for the transmission (T) 690c, reflection (R) 691c, and absorption (A) 692c coefficients of a ten-layered SNSPD detector. The optical response of the ten-layered detector reaches optimal values much faster—at a filling factor of around 0.15. At this point, the entire structure may behave as an ideal coherent absorber with the maximum absorption of a standing wave (see result 693d) equal to one, as may be observed from the calculation for absorption shown in FIG. 6D. Such a detector absorbs light deterministically while multiple detecting layers allow a photon number resolving operation. As also shown in FIG. 6D, the maximum absorption of a travelling wave (see result 694d) reaches 0.5

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of detecting photons comprising:
   arranging a plurality of light absorbing elements along an optical axis of an electromagnetic standing wave to simultaneously interact with the electromagnetic standing wave at a corresponding plurality of points of the electromagnetic standing wave to absorb at least part of the electromagnetic standing wave, the plurality of light absorbing elements being spaced apart from each other;
   arranging a plurality of optically transparent physical spacers, wherein a respective optically transparent physical spacer of the plurality of optically transparent physical spacers is arranged in between respective two adjacent light absorbing elements of the plurality of light absorbing elements; and
   detecting, using a circuit, electrical signals generated in response to the absorption to detect photons corresponding to the electromagnetic standing wave;
   wherein the circuit is defined by a plurality of sub-circuits, where a respective sub-circuit of the plurality of sub-circuits is electrically coupled to a respective light absorbing element of the plurality of light absorbing elements;
   wherein, for each spacing between respective two adjacent light absorbing elements of the plurality of light absorbing elements, the spacing is equal to a whole number of half of a wavelength of the electromagnetic standing wave, such that a relative movement between the plurality of light absorbing elements arranged along the optical axis of the electromagnetic standing wave and the electromagnetic standing wave switches the plurality of light absorbing elements between a total light absorption mode in which the plurality of light absorbing elements interacts with the electromagnetic standing wave at a corresponding plurality of anti-nodes of the electromagnetic standing wave, and a total light transmission mode in which the plurality of light absorbing elements interacts with the electromagnetic standing wave at a corresponding plurality of nodes of the electromagnetic standing wave; and
   wherein the relative movement is made by mechanically moving the plurality of elements.

2. The method as claimed in claim 1, further comprising determining a quantity of the photons based on the electrical signals.

3. The method as claimed in claim 1, further comprising interacting two counter-propagating waves cooperatively with each other to form the electromagnetic standing wave.

4. The method as claimed in claim 3, further comprising generating the two counter-propagating waves from an electromagnetic travelling wave.

5. The method as claimed in claim 3, further comprising generating, from an electromagnetic travelling wave, a reflected propagating wave, wherein the electromagnetic travelling wave and the reflected propagating wave define the two counter-propagating waves.

6. The method as claimed in claim 3,
   wherein interacting the two counter-propagating waves comprises propagating the two counter-propagating waves in a waveguide structure for the two counter-propagating waves to interact cooperatively with each other in the waveguide structure to optically confine the electromagnetic standing wave in the waveguide structure, and
   wherein arranging the plurality of light absorbing elements comprises arranging the plurality of light absorbing elements optically coupled to the waveguide structure.

7. The method as claimed in claim 3,
   wherein interacting the two counter-propagating waves comprises propagating the two counter-propagating waves through respective two optical fibers arranged spaced apart from each other for the two counter-propagating waves to interact cooperatively with each other in a spacing between the two optical fibers, and
   wherein arranging the plurality of light absorbing elements comprises arranging the plurality of light absorbing elements in the spacing.

8. The method as claimed in claim 1, wherein each of the plurality of light absorbing elements comprises a superconducting nanowire single-photon detector, a superconducting microwire single-photon detector, a superconducting film of a transition edge sensor, a p-n junction of a single photon avalanche diode, a photocathode of a photomultiplier tube, a gain region of a visible light photon counter, or a solid-state photomultiplier.

9. A photon detector arrangement comprising:
   a plurality of light absorbing elements configured to be arranged along an optical axis of an electromagnetic standing wave and spaced apart from each other to interact simultaneously with the electromagnetic standing wave at a corresponding plurality of points of the electromagnetic standing wave to absorb at least part of the electromagnetic standing wave;
   a plurality of optically transparent physical spacers, wherein a respective optically transparent physical spacer of the plurality of optically transparent physical spacers is arranged in between respective two adjacent light absorbing elements of the plurality of light absorbing elements; and
   a circuit configured to be electrically coupled to the plurality of light absorbing elements, the circuit being configured to detect electrical signals generated in response to the absorption to detect photons corresponding to the electromagnetic standing wave;

wherein the circuit is defined by a plurality of sub-circuits, where a respective sub-circuit of the plurality of sub-circuits is electrically coupled to a respective light absorbing element of the plurality of light absorbing elements;

wherein, for each spacing between respective two adjacent light absorbing elements of the plurality of light absorbing elements, the spacing is equal to a whole number of half of a wavelength of the electromagnetic standing wave, such that a relative movement between the plurality of light absorbing elements arranged along the optical axis of the electromagnetic standing wave and the electromagnetic standing wave switches the plurality of light absorbing elements between a total light absorption mode in which the plurality of light absorbing elements interacts with the electromagnetic standing wave at a corresponding plurality of anti-nodes of the electromagnetic standing wave, and a total light transmission mode in which the plurality of light absorbing elements interacts with the electromagnetic standing wave at a corresponding plurality of nodes of the electromagnetic standing wave; and wherein the relative movement is made by mechanically moving the plurality of elements.

\* \* \* \* \*